United States Patent [19]
Battles et al.

[11] Patent Number: 5,791,268
[45] Date of Patent: Aug. 11, 1998

[54] SO3 FLUE GAS CONDITIONING SYSTEM WITH CATALYTIC CONVERTER TEMPERATURE CONTROL BY INJECTION OF WATER

[76] Inventors: Richard L. Battles, 5730 Homestead Dr., New Palastine, Ind. 46163; Michael J. Lentz, 736 N. Arlington Ave., Indianapolis, Ind. 46219; Robert A. Wright, 6250 Behner Crossing, Indianapolis, Ind. 46250

[21] Appl. No.: 630,203

[22] Filed: Apr. 10, 1996

[51] Int. Cl.$^6$ ............................................. F23J 11/00
[52] U.S. Cl. .................... 110/345; 110/215; 423/242.1; 423/243.01; 423/532; 423/539
[58] Field of Search ........................ 110/345, 215; 95/6; 423/242.1, 242.2, 243.01, 532, 539

[56] References Cited

U.S. PATENT DOCUMENTS

| | | | |
|---|---|---|---|
| 4,649,034 | 3/1987 | Rutledge | 110/345 X |
| 5,288,303 | 2/1994 | Woracek et al. | |
| 5,582,802 | 12/1996 | Spokoyny et al. | |

Primary Examiner—Henry A. Bennett
Assistant Examiner—Susanne C. Tinker
Attorney, Agent, or Firm—Ice Miller Donadio & Ryan; Jay G. Taylor

[57] ABSTRACT

An improved method and system for cooling the sulfur dioxide gas stream flowing from a sulfur furnace to a catalytic converter in a sulfur trioxide flue gas conditioning system. Water is injected into the sulfur dioxide gas stream upstream of the catalytic converter as appropriate to maintain the temperature at the inlet of the catalytic converter at a desired level.

22 Claims, 6 Drawing Sheets

SO3 FLUE GAS CONDITIONING SYSTEM WITH CATALYTIC CONVERTER TEMPERATURE CONTROL BY INJECTION OF WATER

FIELD OF THE INVENTION

This invention relates to a system for treating boiler flue gas by conditioning it with sulfur trioxide to improve the removal of particulate matter contained therein by electrostatic and other means, and more particularly, to a flue gas conditioning system that controls the temperature of the $SO_2$ containing gas stream by injecting water therein upstream of the catalytic converter which converts the $SO_2$ to $SO_3$.

BACKGROUND OF THE INVENTION

The increasing demand for electrical power has forced electrical utilities to burn increasing quantities of fossil fuels such as coal and oil. However, electric utilities also face increasing environmental standards imposed upon their operations by state and federal regulatory agencies that mandate reduced particulate and acid generating smoke stack emissions. To reduce acid generating emissions, electrical utilities have turned to burning low-sulfur coal in their boilers to generate the steam necessary for electric power generation. To reduce the particulate emissions, electric utilities generally use a flue gas treatment system to remove a majority of the particulate matter in the gas effluent passing out of the smoke stack. Such flue gas treatment systems typically comprise an electrostatic device such as an electrostatic precipitator or a fabric filter baghouse to remove the particulate. Such devices may also provide a source of conditioning agent to the flue gas to enhance the effectiveness of the precipitator or filter in removing the particulate.

The efficiency of an electrostatic precipitator in removing particulate matter from the boiler flue gas is partially dependent upon the electrical resistivity of the entrained particulate matter in the boiler flue gas. The entrained particulate matter expelled from a boiler fired with low-sulfur coal, i.e., coal having less than 1 percent sulfur, has been found to have a resistivity of approximately $10^{13}$ ohms/cm. It has been determined that the most efficient removal of particulate matter by electrostatic precipitation occurs when the particulate matter resistivity is approximately $10^{10}$ ohms/cm. Therefore, to obtain more effective use of an electrostatic precipitator, the resistivity of the entrained particulate matter from low-sulfur content coal must be reduced. Electrical utilities have long used conditioning agents introduced into the flue gas flow upstream of the electrostatic precipitator to reduce the resistivity of the entrained particles. Various chemicals, such as water, anhydrous ammonia, sulfuric acid, sulfur trioxide, phosphoric acid and various ammonia-bearing solutions have been used as conditioning agents.

In systems using sulfur trioxide as the conditioning agent, the sulfur trioxide is typically generated by combusting sulfur, usually elemental sulfur, in a sulfur furnace to generate sulfur dioxide. The sulfur dioxide is then passed through a catalytic converter which converts the sulfur dioxide to sulfur trioxide. A flue gas conditioning system of the type using sulfur trioxide as the conditioning agent is described in U.S. Pat. Nos. 5,032,154 and 5,261,931 to Robert A. Wright for a Flue Gas Conditioning System and assigned to Wilhelm Environmental Technologies, Inc., the assignee of this application. The disclosures of U.S. Pat. Nos. 5,032,154 and 5,261,931 are incorporated by reference.

The efficiency at which the catalytic converter converts $SO_2$ to $SO_3$ is based on the temperature at which the catalytic converter operates. For the catalytic converter to convert $SO_2$ to $SO_3$ efficiently, it must be at an operating temperature within the range of 725° F. to 1000° F. Typical $SO_3$ flue gas conditioning systems have controlled the temperature of the $SO_2$ gas stream entering the catalytic converter by increasing process gas flow, decreasing auxiliary heater output or by reducing the input heat from the $SO_2$ furnace by using an air-to-air heat exchanger to remove excess heat from the $SO_2$ gas stream. An example of the latter technique is disclosed in U.S. Pat. No. 5,244,642.

The above techniques for controlling the temperature of the $SO_2$ gas stream suffer from the disadvantage of handling larger volumes of air and hence require larger blowers and heaters, or of having slow response times. That is, when an adjustment is made to the control parameter to reduce or increase the temperature of the $SO_2$ gas stream, there is a considerable time lag from the time the adjustment is made to a corresponding change in the temperature of the $SO_2$ gas stream. During this time lag, the temperature of the $SO_2$ gas stream is not at the optimum desired temperature to achieve the desired efficiency from the catalytic converter.

Another disadvantage suffered by the above techniques is that they limit the amount of $SO_2$ that can be produced. As is known, the more sulfur that is burned in the sulfur furnace, the higher the temperature of the sulfur furnace with a corresponding increase in the temperature of the $SO_2$ gas stream exiting the sulfur furnace. This in turn requires a greater degree of cooling to lower the temperature of the $SO_2$ gas stream to the desired converter inlet set point temperature. Thus, to achieve a desired concentration of $SO_2$, the process air blower, process air heater, sulfur furnace, and pipe size at the sulfur furnace outlet must be large enough so that the desired concentration of $SO_2$ can be produced and the temperature of the $SO_2$ gas stream sufficiently controlled so that the $SO_2$ gas stream is at the desired set point temperature when it enters the catalytic converter. However, the above techniques have limited cooling capacity which limits the maximum concentration of $SO_2$ in the $SO_2$ gas stream.

It is an object of this invention to provide a technique for controlling the temperature of the $SO_2$ gas stream that provides for a relatively instantaneous, compared to the heretofore used techniques, temperature change thus eliminating or greatly reducing the time lag heretofore involved in controlling the temperature of the $SO_2$ gas stream.

It is also an object of this invention to provide a technique for controlling the temperature of the $SO_2$ gas stream that has greater capacity to cool the temperature of the $SO_2$ gas stream thus permitting the sizes of various components in the $SO_3$ flue gas conditioning system to be greatly reduced.

SUMMARY OF THE INVENTION

In a sulfur trioxide flue gas conditioning system according to this invention, a fine mist of water is injected into the $SO_2$ gas stream, such as at the outlet of the sulfur furnace or in the piping which couples the sulfur furnace to the catalytic converter, to control the temperature of the $SO_2$ gas stream. Preferably, the rate of water injection is controlled by a control loop based on the inlet temperature of the catalytic converter selected to suit the $SO_2$ concentration in the gas stream. Illustratively, the temperature of the $SO_2$ gas stream is controlled by adjusting the volume output of the process air blower at low $SO_3$ feedrates. At high $SO_3$ feedrates, and particularly where the process air blower is at its maximum output, temperature control of the $SO_2$ gas stream is achieved by water injection.

Additional features and advantages of the invention will become apparent to those skilled in the art upon consideration of the following detailed description of a preferred embodiment of the invention, exemplifying the best mode of carrying out the invention as presently perceived. The detailed description particularly refers to the following figures in which:

DETAILED DESCRIPTION OF THE PREFERRED EMBODIMENT

Figure 1:
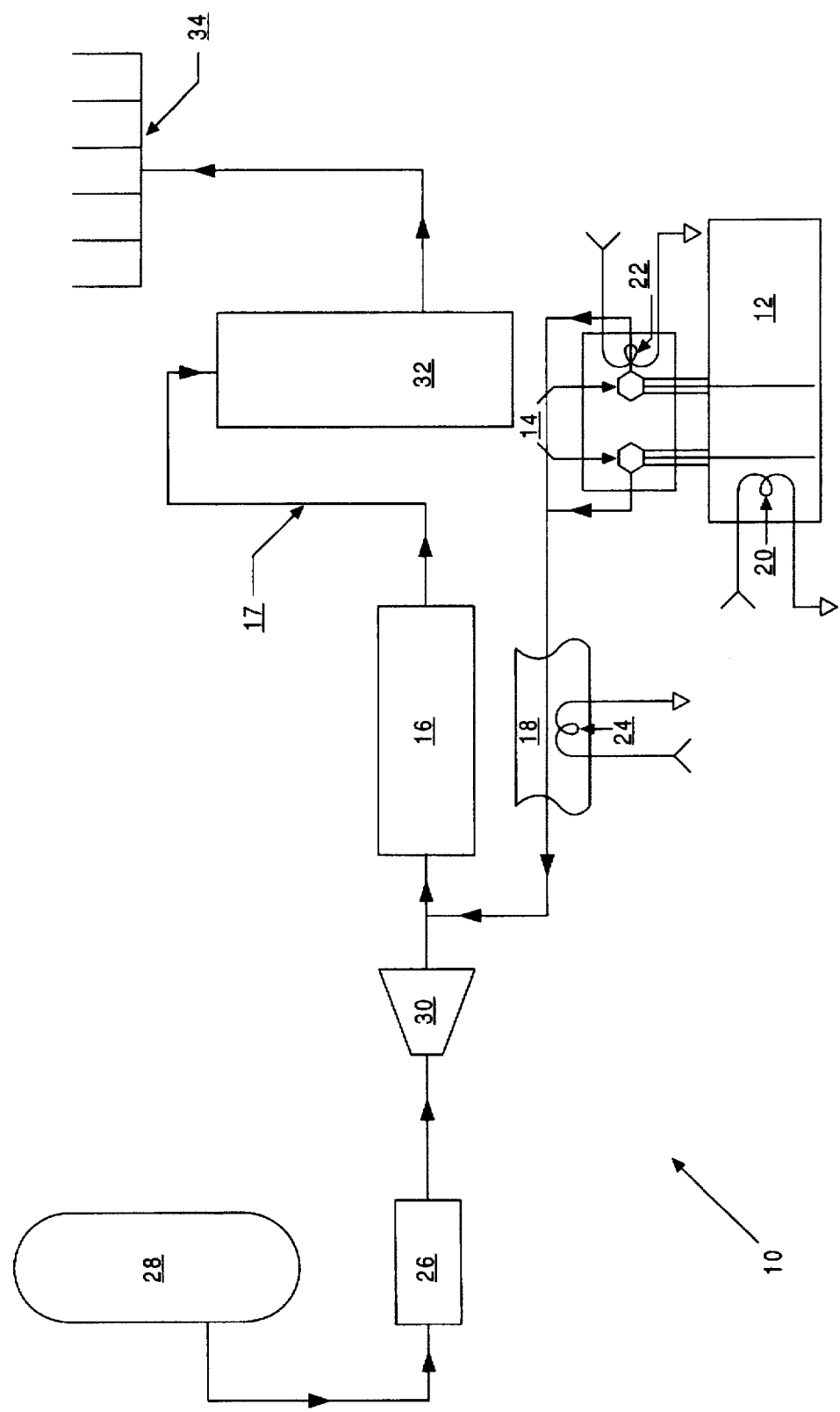
FIG. 1 is a schematic of a prior art $SO_3$ flue gas conditioning system.

Referring to FIG. 1, a prior art $SO_3$ flue gas conditioning system 10 is shown. Flue gas conditioning system 10 has a storage vessel 12, such as a pit or a tank, for storing elemental sulfur. Sulfur pump or pumps 14 are coupled to storage tank 12 and pump elemental sulfur out of tank 12 to the inlet of a sulfur furnace 16 through a steam jacketed pipe 18. Tank 12, pump(s) 14 and steam jacketed pipe 18 are heated by steam coils 20, 22, 24, respectively, which are coupled to a source of steam (not shown).

Flue gas conditioning system 10 also has a process blower 26 having an inlet coupled to a bag house or air filter 28 and an outlet coupled to an inlet of a heater 30. An outlet of heater 30 is coupled to the inlet of sulfur furnace 16. An outlet of sulfur furnace 16 is coupled through a pipe 17 to an inlet of catalytic converter 32 and an outlet of catalytic converter is coupled to probes 34. Probes 34 are mounted in an electrostatic precipitator (not shown) of an electrostatic flue gas pollution control system (not shown).

In operation, elemental sulfur is pumped from tank 12 by pump(s) 14 through steam jacketed pipe 18 to the inlet of sulfur furnace 16. The temperature of tank 12, pump(s) 14 and steam jacketed pipe 18 is appropriately controlled by the use of steam coils 20, 22, 24 to maintain the temperature of the elemental sulfur between 270° F.–290° F. to keep it in its proper molten state so that it can be pumped.

Process blower 26 draws air in through bag house 28, which filters the air, and forces it into heater 30 and then into sulfur furnace 16. The heated air contacts the elemental sulfur in sulfur furnace 16 which combusts the elemental sulfur. The combustion of the elemental sulfur generates $SO_2$ which is forced from the outlet of sulfur furnace 16 into the inlet of catalytic converter 32. Catalytic converter 32 catalyzes the $SO_2$ into $SO_3$ which then flows from an output of catalytic converter 32 into probes 34 which injects the $SO_3$ into the electrostatic precipitator (not shown) for conditioning the flue gas flowing through the electrostatic precipitator. Flue gas conditioning system 10 is described in more detail in U.S. Pat. No. 5,032,154.

As mentioned above, for catalytic converter 32 to effectively convert $SO_2$ to $SO_3$, its operating temperature must be maintained within the range of about 725° F. to 1000° F. To achieve optimum efficiency, the inlet temperature of the catalytic converter is typically maintained at a setpoint, depending upon $SO_2$ gas concentration.

In many systems, the setpoint for the inlet temperature of the catalytic converter is a constant, usually around 800° F. U.S. Pat. No. 5,032,154 discloses the use of a floating setpoint where the setpoint is varied about 60° F. from 790° F. to 850° F. depending on the $SO_2$ gas strength, i.e., the amount of $SO_2$ produced by the sulfur furnace to achieve maximum $SO_2/SO_3$ conversion in the catalytic converter.

Figure 2:
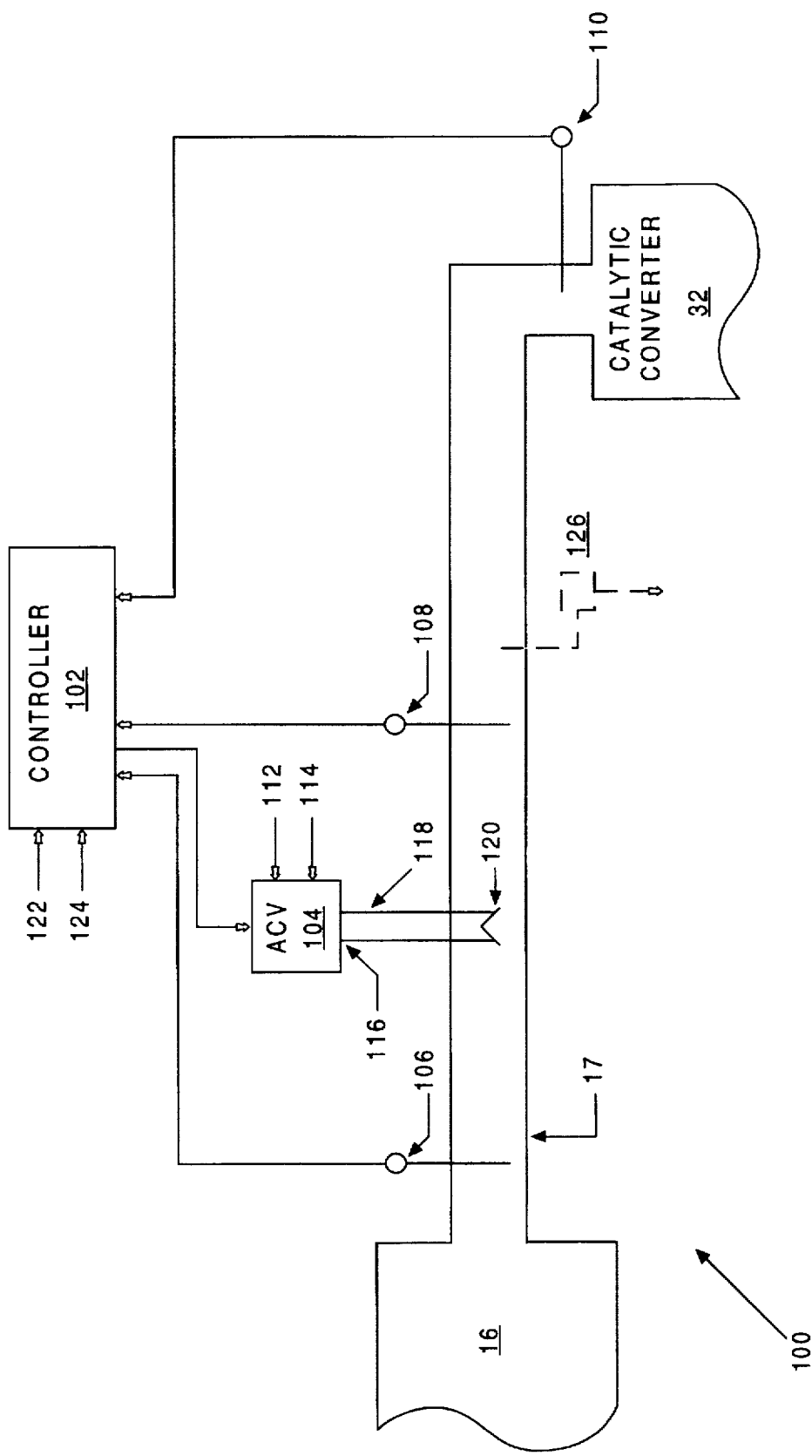
FIG. 2 is a schematic of the sulfur furnace to catalytic converter section of a $SO_3$ flue gas conditioning system incorporating the water injection cooling of this invention.

FIG. 2 shows a section of a $SO_3$ flue gas conditioning system 100 which utilizes the water injection cooling of this invention to control the temperature of the $SO_2$ gas stream and maintain the inlet temperature of the catalytic converter at its selected setpoint. The system of FIG. 2 is a modification of the system of FIG. 1 and like elements will be identified with like reference numerals.

Referring to FIG. 2, $SO_3$ flue gas conditioning system 100 includes, in addition to the elements shown in FIG. 1, a controller 102, automatic control valve (ACV) 104 and temperature sensors 106, 108, 110. ACV 104 has a water inlet 112 coupled to a source of water (not shown) and an air inlet 114 coupled to a source of pressurized air (not shown). ACV 104 also has an outlet 116 coupled by a pipe 118 to a spray nozzle 120 which is mounted in pipe 17 which couples the outlet of sulfur furnace 16 to the inlet of catalytic converter 32. Temperature sensor 106 is mounted at the outlet of sulfur furnace 16 and has an output coupled to an input of controller 102. Temperature sensor 108 is mounted in pipe 17 slightly downstream of nozzle 120 and has an output coupled to an input of controller 102. Temperature sensor 110 is mounted at the inlet of catalytic converter 32 and has an output coupled to an input of controller 102. Controller 102 also has an input coupled to a process control signal line 122 on which is present a signal indicative of the temperature of process heater 30 and an input coupled to a process control signal line 124 on which is present a signal indicative of the flow rate of process air out of process air blower 26.

Controller 102 can illustratively be implemented with the Allen-Bradley T30 Plant Floor Terminal Programmable Controller or the Bristol-Babcock Network 3000 Compatible Intelligent Controller which comprises controller 32 in U.S. Pat. No. 5,261,931. Controller 102 can also be a separate controller provided by a programmable microprocessor and random access memory.

Referring to FIG. 1, the operation of $SO_3$ flue gas conditioning system 10 and how the temperature of the $SO_2$ gas stream flowing into catalytic converter 32 is controlled is described. Blower 26, which is illustratively equipped with a variable frequency drive, blows ambient air through electric or gas fired heater 30. Hot air enters sulfur furnace 16 where sulfur is combusted to generate $SO_2$. The $SO_2$ and process air exit sulfur furnace 16 and flow through pipe 17 into catalytic converter 32 where they pass across a vanadium pentoxide catalyst to form $SO_3$ which is then injected into the flue duct of the boiler system via probes 34. $SO_3$ flue gas conditioning system 10 is controlled by plant load and trim functions as described in U.S. Pat. No. 5,261,931. As described therein, control of $SO_3$ flue gas conditioning systems 10 is based on the temperature at the inlet of catalytic converter 32 and the $SO_2$ concentration in the gas stream flowing into catalytic converter 32.

For economy in blower and heater sizing, the output of blower 26 is controlled to optimize the concentration of $SO_2$ in the gas stream flowing into catalytic converter 32 (i.e., lower demand for $SO_3$ in ppm results in lower blower output to raise the temperature at the outlet of sulfur furnace 16 and reduce the output of heater 30, as described in U.S. Pat. No. 5,261,931).

As the $SO_3$ feedrate increases, the volume of blower 26 increases to maintain the temperature at the inlet of catalytic converter 32 at its setpoint. With this design, the concentration of $SO_2$ in the gas stream entering catalytic converter 32 is not controlled. Rather, the temperature of the setpoint for the inlet temperature of catalytic converter 32 is controlled (for optimum converter efficiency) to achieve the desired $SO_3$ feedrate.

As furnace temperature declines in response to a lower sulfur feedrate, i.e., less sulfur being burned in sulfur furnace 16, the output of blower 26 is decreased down to a minimum output to maintain a reasonable flow of gas through probes 34. At most $SO_3$ feedrates, the declining flow of air from blower 26 will cause the inlet temperature of catalytic converter 32 to increase and will allow the output of heater 30 to be reduced to achieve operating economies. At selected minimum blower air flow, the output of heater 30 will maintain the inlet temperature at catalytic converter 32 at a setpoint to suit $SO_3$ feedrate, as described in U.S. Pat. No. 5,261,931. Varying the output of blower 26 controls the inlet temperature at catalytic converter 32 to minimize the use of heater 30 and maximize the use of "free heat" from the combustion of sulfur in sulfur furnace 16.

Referring to FIGS. 1 and 2, the modification to the $SO_3$ flue gas conditioning system 10 of FIG. 1 shown in FIG. 2 achieves control of the temperature of the $SO_2$ gas stream entering catalytic converter 32 much quicker with a significantly smaller process air blower 26, heater 30, and piping sizes. In operation, controller 102 will vary the output of blower 26 to control the temperature at the inlet of catalytic converter 32 in the same manner as has just been described until blower 26 reaches its maximum output. Once blower 26 reaches its maximum output, controller 102 then causes water to be injected into pipe 17 via ACV 104, pipe 118 and spray nozzle 120. The water injected into pipe 17 vaporizes instantly to superheated steam and becomes part of the working volume of gas flow. As more steam is formed by water evaporation to control the temperature of the $SO_2$ gas stream, the output of blower 26 is reduced so that the volume of gas flowing into catalytic converter 32 remains relatively constant. Illustratively, controller 102 determines the amount of steam produced based on the amount of water injected into pipe 17 and uses this information to cause the output of blower 26 to be reduced a corresponding amount. This allows for changes in the concentration of $SO_2$ in the $SO_2$ gas stream without requiring large changes in the output of blower 26. An appropriate amount of water is injected into pipe 17 to cool the $SO_2$ gas stream so that when it enters catalytic converter 32 it is at the inlet setpoint temperature.

Controller 102 determines the amount of water to inject to suit the $SO_2$ concentration in the $SO_2$ gas stream flowing from sulfur furnace 16 through pipe 17 and into catalytic converter 32. Illustratively, at low $SO_3$ feedrates, i.e., those requiring the production of 4% or less concentration of $SO_2$ in the $SO_2$ gas stream, controller 102 does not cause ACV 104 to inject water into pipe 17 and the output of blower 26 is varied to control the temperature of the $SO_2$ gas stream so that its temperature when it enters the inlet of catalytic converter 32 is at the inlet setpoint temperature. Controller 102 monitors the temperature at the inlet of catalytic converter 32 using temperature sensor 110 and adjusts the amount of water being injected into pipe 17 accordingly to achieve and maintain the temperature of the $SO_2$ containing gas stream entering the inlet of catalytic converter 32 at the desired set point. Alternatively, when the desired feedrate of $SO_3$ at higher rates, i.e., feedrates requiring the production of more than 4% concentration of $SO_2$ in the $SO_2$ gas stream, controller 102 determines the concentration of $SO_2$ in the $SO_2$ gas stream flowing through pipe 17 based on the outlet temperature of process heater 30, as provided to controller 102 on process control signal line 122, the process air flow, as provided to controller 102 on process control signal line 124, and the temperature at the outlet of sulfur furnace 16, as sensed by temperature sensor 106 and provided to controller 102. In this regard, flue gas conditioning system 100 determines the desired concentration of $SO_2$ based on the desired $SO_3$ feedrate and has adjusted the supply of sulfur to sulfur furnace 16 accordingly. Once controller 102 determines the $SO_2$ concentration, controller 102 determines the proper amount of water to inject into pipe 17 based on this information so that the temperature of the $SO_2$ gas stream entering catalytic converter 32 is at the desired inlet temperature setpoint.

Figure 3:
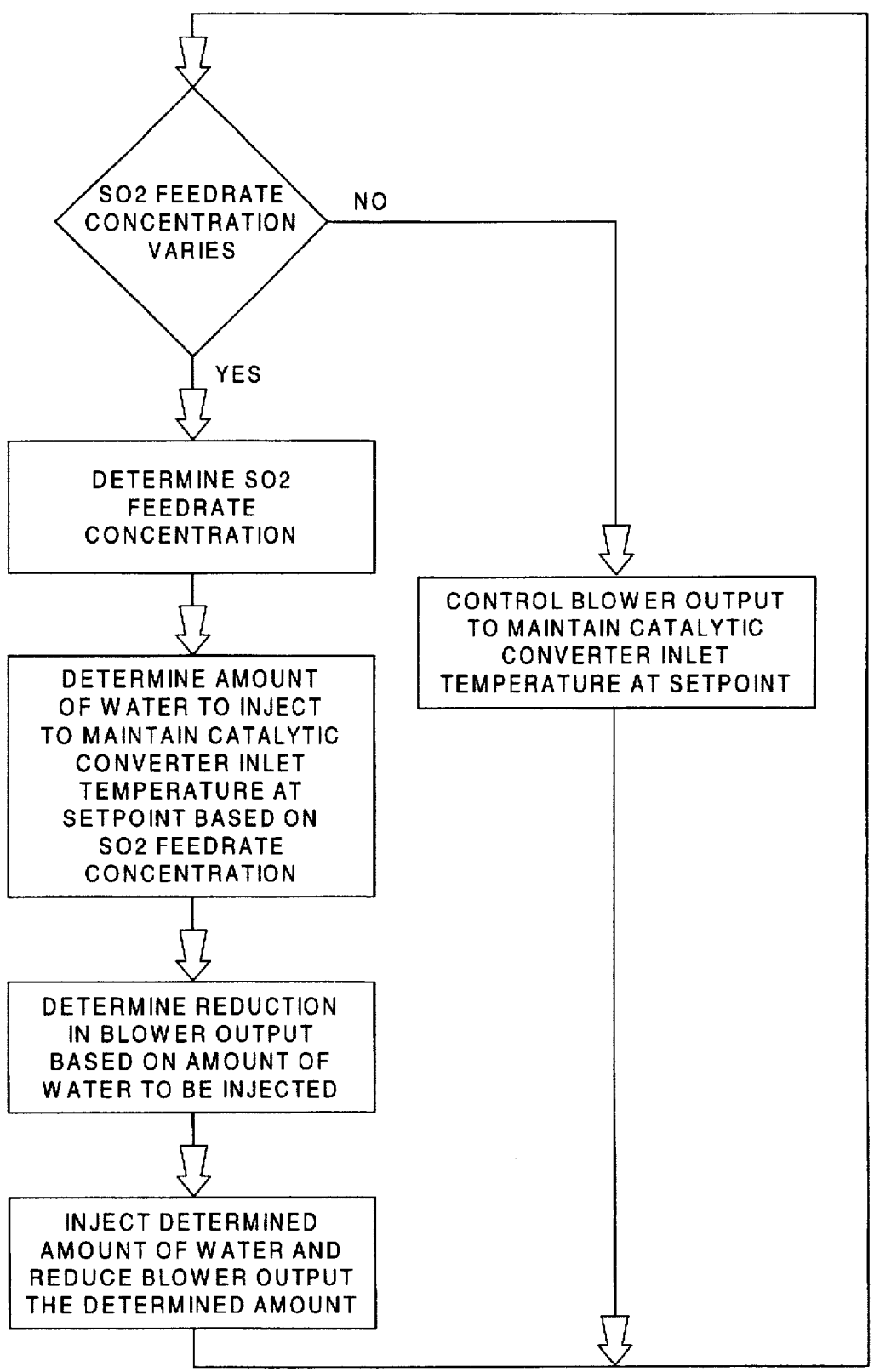
FIG. 3 is a flow chart of a program for controlling the invention of FIG. 2.

Referring to FIG. 3, in the second, water injection cooling mode of operation, controller 102 can adjust the output of process air blower 26 to create a higher concentration of $SO_2$ in the $SO_2$ gas stream flowing through pipe 17 into catalytic converter 32 and determine a new desired inlet temperature setpoint of catalytic converter 32 and adjust the water injection rate accordingly so that the temperature of the $SO_2$ gas stream entering catalytic converter 32 is at the desired inlet temperature setpoint. By increasing the concentration of $SO_2$ in the $SO_2$ gas stream, the energy required to operate $SO_3$ flue gas conditioning system 100 can be reduced. At the temperatures discussed, steam has no effect on the catalyst in catalytic converter 32 and thus behaves like process air. By the use of the water injection cooling of this invention, the output of blower 26 can be changed to control the temperature of the $SO_2$ gas stream for low concentrations of $SO_2$, such as from 2% to 4%. As greater concentrations of $SO_2$ in the $SO_2$ gas stream, such as from 4% to 10%, water injection is used to control the temperature of the $SO_2$ gas stream. The output of blower 26 is then reduced to accommodate the addition of steam to the $SO_2$ gas stream. Thus, the volume of gas flowing into the inlet of catalytic converter 32 remains relatively constant and the velocities of the gas flowing through the pipes and probes varies only slightly. Illustratively, in flue gas conditioning systems designed for typical operation at $SO_2$ concentrations toward the higher end, i.e., such as 4% to 10%, a two-bed catalytic converter is used for catalytic converter 32.

The water injection cooling of this invention provides an additional benefit where a "swinging setpoint" (such as disclosed in U.S. Pat. No. 5,261,932) is used for the inlet temperature setpoint for the catalytic converter. Water injection cooling permits the setpoint for the inlet of catalytic converter 32 to be kept at 790° F. or less.

$SO_3$ flue gas conditioning system 100 can optionally include a dew point sensor 126 mounted in pipe 17 and having an output coupled to an input of controller 102, as shown in dashed-lines in FIG. 2. Controller 102 determines the acid dewpoint of the $SO_2$ gas stream flowing through pipe 17 based on the concentration of $SO_2$ and the amount of water injected into pipe 17. Controller 102 then verifies its determination using the signal from dewpoint sensor 126 and adjusts the temperature of the $SO_2$ gas stream accordingly so that it is always above the acid dewpoint temperature.

Figure 4:
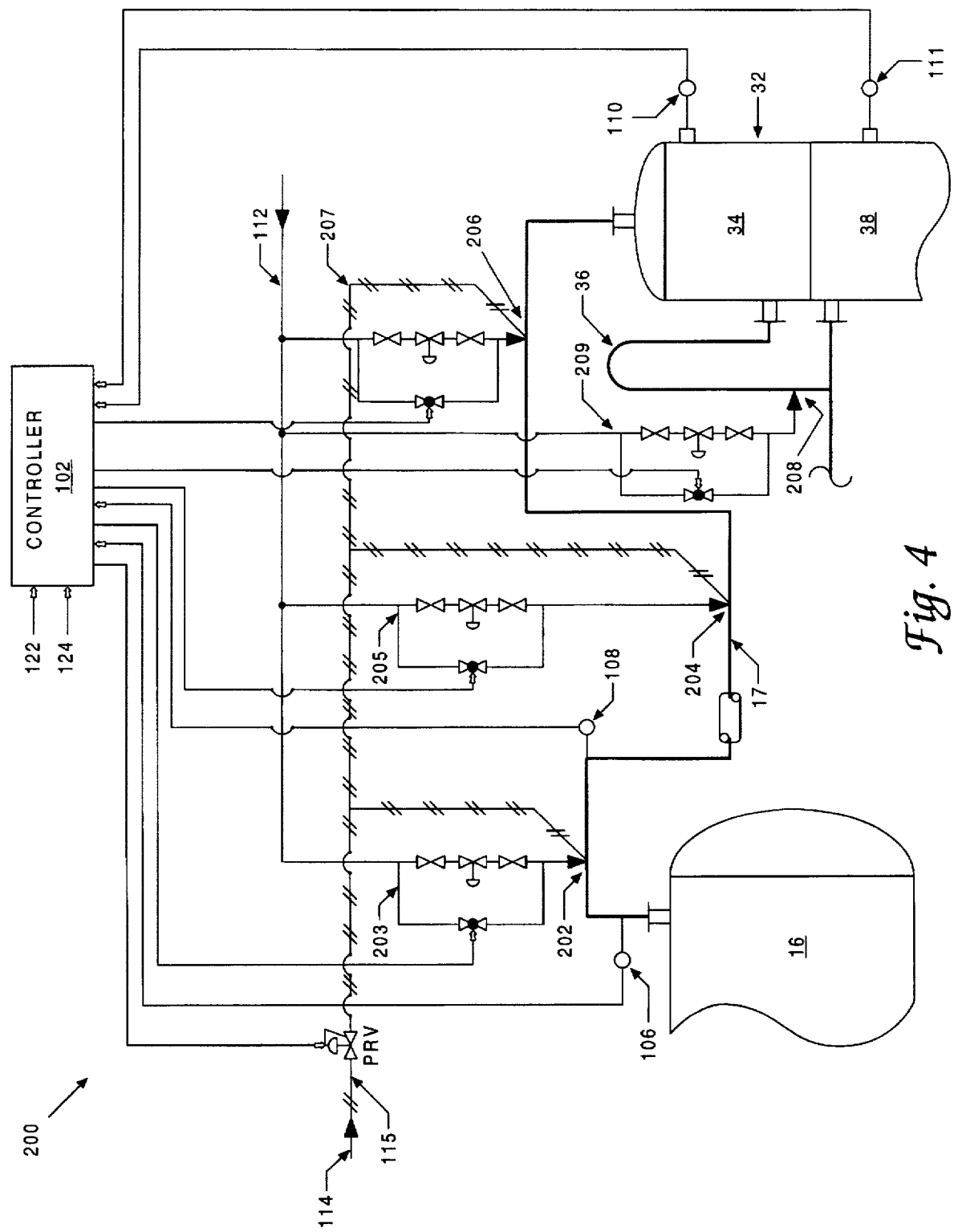
FIG. 4 is a schematic of a variation of the system shown in FIG. 2.

FIG. 4 is a schematic showing a variation of the embodiment of FIG. 2. Referring to FIG. 4, $SO_3$ flue gas conditioning system 200 has, in addition to the elements shown in FIG. 1, a first water nozzle 202 coupled to pipe 17 generally at the outlet of sulfur furnace 16, a second water nozzle 204 coupled to pipe 17 generally midway between sulfur furnace 16 and catalytic converter 32, and a third water nozzle 206 coupled to pipe 17 generally at the inlet of catalytic converter 32. Water nozzle 202 is coupled through pneumatic water control valves 203 to water source 112 and to the source of atomizing air 114 through a process control valve 115. Water nozzle 204 is coupled through pneumatic water control valves 205 to a source of water 112 and to atomizing air source 114 through the process control valve 115. Water nozzle 206 is coupled through pneumatic water control valves 207 to water source 112 and to atomizing air source 114 through process control valve 115. In the embodiment of FIG. 3, catalytic converter 32 is a dual bed catalytic converter, such as is disclosed in U.S. Pat. No. 5,032,154, and has a first stage 34 coupled by a pipe 36 to a second stage 38. A fourth water nozzle 208 is coupled to pipe 36 as is a source of dilution air (not shown). Water nozzle 208 is coupled to water source 112 through pneumatic water control valves 209 and to atomizing air source 114 through process control valve 115. Process control valve 115 and water control valves 203, 205, 207, 209 are all coupled to outputs of controller 102. A temperature session 111 is mounted generally at an inlet of the second stage 38 of catalytic converter 32 and has an output coupled to an input of controller 102. Water nozzles 202, 204, 206 and 208 are atomizing or fogging nozzles such as #1/4TDD425HSS, manufactured by Spraying Systems, North Avenue, P. 0. Box 7900, Wheaton, Ill. 60189. Pneumatic water control valves 203, 205, 207, 209 are illustratively Ball Valves, manufactured by Velan, 2125 Ward Avenue, Montreal, Quebec H4M1T6 CANADA.

Figure 5:
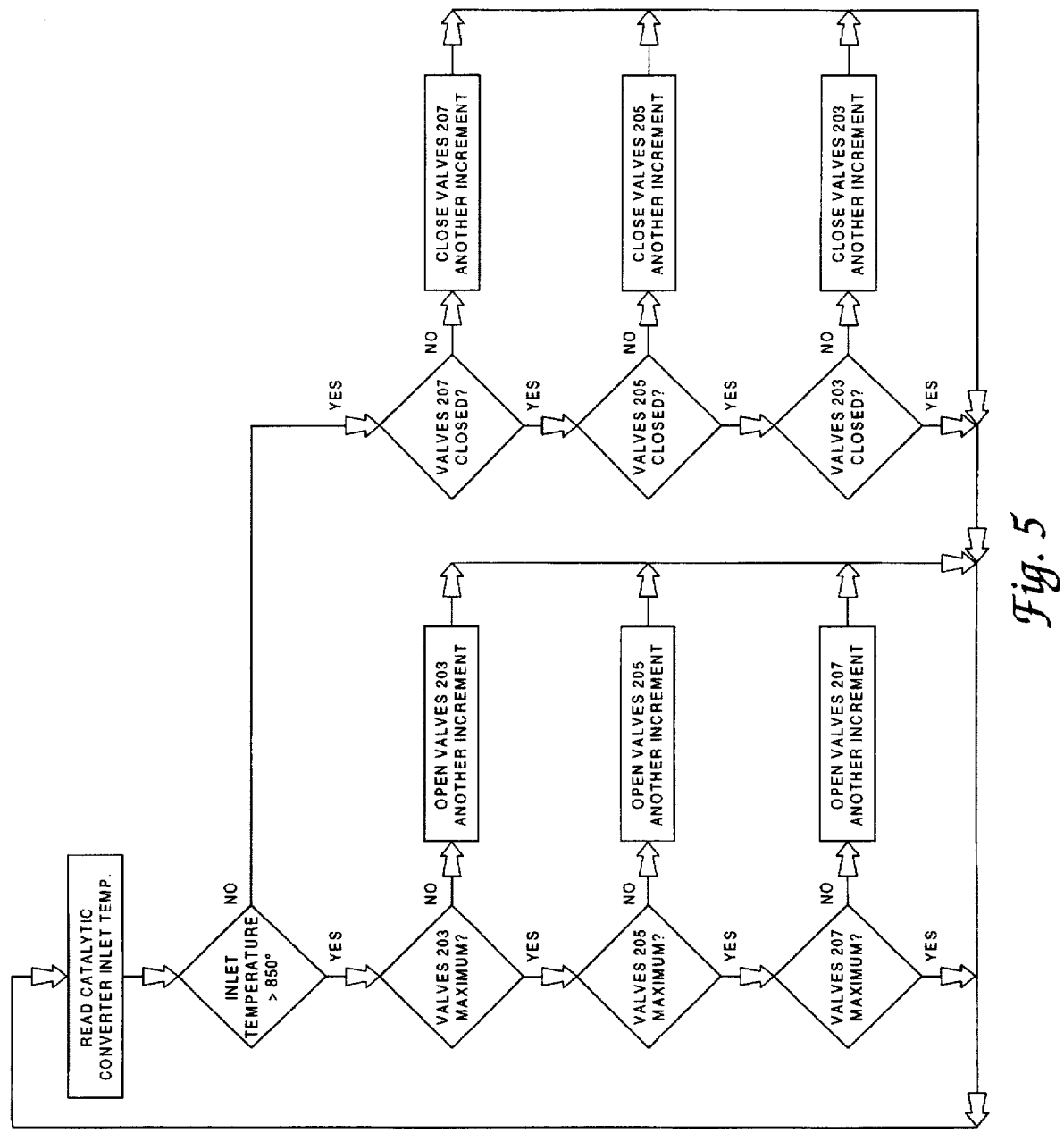
FIG. 5 is a flow chart of a program for controlling the invention of FIG. 4.

Referring to FIG. 5, in operation, the cooling loop circuit controller, illustratively controller 102, opens water nozzles 202, 204, 206 sequentially, via pneumatic water control valves 203, 205, 207, as the outlet temperature of sulfur furnace 16 rises to maintain the inlet temperature of catalytic converter 32 at the setpoint, such as 850° F. At maximum sulfur burning rates, the input of water via nozzles 202, 204, 206 is sufficient to absorb the excess heat generated by the sulfur burning to maintain the setpoint temperature at the inlet of catalytic converter 32. As $SO_3$ demand decreases, which results in less sulfur being burned, the cooling loop circuit controller closes water nozzles 202, 204, 206 in reverse order, thus removing less heat in the gas flowing from sulfur furnace 16 to catalytic converter 32, to maintain the setpoint temperature at the inlet of catalytic converter 32. Although FIG. 5 shows the use of the setpoint temperature as the control parameter, illustratively, hysteresis would be provided. That is, as long as the inlet temperature of the catalytic converter is within a desired range, the cooling loop controller would maintain the status quo regarding the amount of water being injected.

Figure 6:
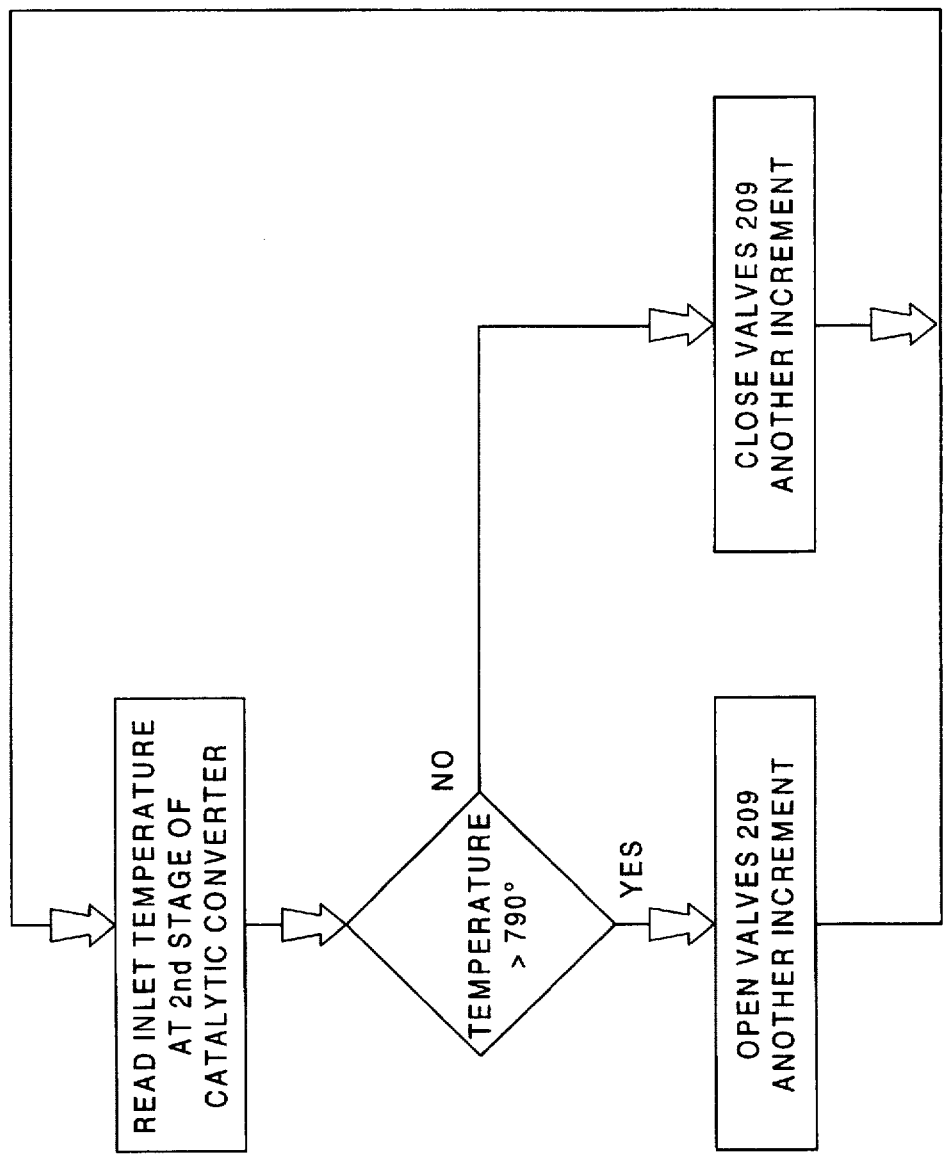
FIG. 6 is a flow chart of a program for controlling the invention of FIG. 4 as it is used to control the inlet temperature of the second stage of a two-stage catalytic converter.

The fourth water nozzle, water nozzle 208, serves the same cooling function for the second stage 38 of catalytic converter 32 to maintain the temperature at the inlet of the second stage 38 at the desired setpoint temperature (approx. 800° F.). A temperature sensor 210 is mounted generally at the inlet of the second stage 38 of catalytic converter 32 and is coupled to an input of controller 102 to monitor the temperature at the inlet of the second stage 38. As shown in FIG. 6, controller 102 then opens water nozzle 208, via pneumatic water control valves 209, as appropriate to vary the temperature of the gas entering the inlet of second stage 38 to maintain the temperature at the inlet of second stage 38 at the desired set point temperature, illustratively 750° F. Again, hysteresis would preferably be provided.

The foregoing invention is useful not only in new $SO_3$ flue gas conditioning systems, but can be retrofitted into existing $SO_3$ which vary the output of the process air blower to control the temperature of the $SO_2$ gas stream flowing out of the sulfur furnace and into the catalytic converter or which use heat exchangers to control the temperature of the $SO_2$ gas stream. Further, while the invention has been described in conjunction with the use of elemental sulfur as the sulfur which is combusted in sulfur furnace 16 to generate $SO_2$, it should be understood that the other forms of sulfur can be used, such as granular sulfur and emulsoid sulfur.

The foregoing invention provides a number of advantages. It permits much smaller blower and heaters to be used and reduces the amount of power required to operate the $SO_3$ flue gas conditioning system. Smaller diameter hot gas piping can be used. Costs for insulation and lagging are less. The invention achieves very quick temperature response and allows for much greater freedom in selecting preferred pipe sizes and maximum $SO_2$ concentration.

Although the invention has been described in detail with reference to certain preferred embodiments, materials and specific examples, variations and modifications exist within the scope and spirit of the invention as described and as defined in the following claims.

What is claimed is:

1. In a sulfur trioxide flue gas conditioning system that has a sulfur furnace for generating sulfur dioxide by combusting sulfur therein, means for coupling the sulfur furnace to a catalytic converter which converts sulfur dioxide generated by the sulfur furnace into sulfur trioxide, an improved system for reducing the temperature of the sulfur dioxide gas stream flow from the sulfur furnace to the catalytic converter, comprising:

a. a water nozzle coupled to the means for coupling the sulfur furnace to the catalytic converter;

b. a water control valve coupling the water nozzle to a source of water; and a controller having an output coupled to a control input of the water control valve, the controller opening and closing the water control valve to cause water to selectively flow from the water nozzle into the sulfur dioxide gas stream to vary the temperature of the sulfur dioxide gas stream so that the temperature of the sulfur dioxide gas stream as it enters the catalytic converter is at a desired temperature.

2. The system of claim 1 wherein the catalytic converter comprises a dual stage catalytic converter, and further including:

a. a second water nozzle coupled to the inlet of the second stage of the catalytic converter;

b. a second water control valve coupling an inlet of the second water nozzle to the source of water, the second water control valve having a control input coupled to the output of the controller;

and wherein the controller opens and closes the water control valve and the second water control valve to cause water to selectively flow from the water nozzle and the second water nozzle into the sulfur dioxide gas stream to vary the temperature of the sulfur dioxide gas stream so that the temperature of the sulfur dioxide gas stream as it enters the second stage of the catalytic converter is at a desired temperature.

3. The system of claim 1, wherein the means for coupling the sulfur furnace to the catalytic converter comprises a pipe, the water nozzle and water control valve comprising a plurality of water nozzles and water control valves, the plurality of water nozzles coupled to the pipe in spaced relation to each other, each water nozzle coupled through a respective water control valve to the water source, a temperature sensor coupled to the outlet of the sulfur furnace and having an output coupled to an input of the controller, the controller varying the temperature of the sulfur dioxide flue gas stream by sequentially opening and closing the water control valves based on the temperature at the outlet of the sulfur furnace sensed by the temperature sensor.

4. The system of claim 3 wherein the catalytic converter comprises a dual stage catalytic converter, and further including:
  a. a second water nozzle coupled to the inlet of the second stage of the catalytic converter;
  b. a second water control valve coupling an inlet of the second water nozzle to the source of water, the second water control valve having a control input coupled to the output of the controller;
and wherein the Controller opens and closes the water control valve and the second water control valve to cause water to selectively flow from the water nozzle into the sulfur dioxide gas stream to vary the temperature of the sulfur dioxide gas stream so that the temperature of the sulfur dioxide gas stream as it enters the second stage of the catalytic converter is at a desired temperature.

5. The system of claim 3 wherein the plurality of water nozzles comprise three nozzles, a first one of the nozzles coupled to the pipe generally at the outlet of the sulfur furnace, a second one of the nozzles coupled to the pipe generally midway between the sulfur furnace and the catalytic converter, a third one of the nozzles coupled to the pipe generally at an inlet of the catalytic converter, the plurality of water control valves comprising three pneumatic water control valves wherein each nozzle is coupled to the water source through a respective one of the pneumatic water control valves.

6. The system of claim 5 wherein each nozzle comprises an atomizing nozzle having an air inlet coupled to a source of atomizing air.

7. The system of claim 3 wherein the nozzle comprises an atomizing nozzle having an air inlet coupled to a source of atomizing air.

8. The system of claim 1 wherein the controller includes means for determining the amount of water to inject into the sulfur dioxide gas stream to bring the temperature of the sulfur dioxide gas stream at the inlet of the catalytic converter to the desired setpoint temperature and controlling the water control valve to inject the determined amount of water into the sulfur dioxide flue gas stream from the water nozzle.

9. The system of claim 8 wherein the controller's means determining the amount of water to inject includes means for determining the rate at which to inject given amounts of water and controlling the water control valve to inject the water into the sulfur dioxide flue gas stream and the determined rate.

10. The system of claim 9 wherein the water control valve comprises pneumatic water control valves.

11. The system of claim 1 wherein the system includes a blower for blowing process air into the sulfur furnace, the blower having an outlet coupled to an inlet of the sulfur furnace and an inlet coupled to a source of process air and a control input coupled to an output of the controller, the controller further including means for determining the amount of steam produced by the evaporation of water injected into the $SO_2$ gas stream and varying the output of the blower accordingly to maintain the volume of gas entering the catalytic converter relatively constant.

12. The system of claim 1 wherein the controller includes means for determining the concentration of $SO_2$ in the $SO_2$ gas stream and determining a proper amount of water to inject into the $SO_2$ gas stream based thereon and controlling the water control valve to inject the determined proper amount of water into the $SO_2$ gas stream.

13. In a sulfur trioxide system having a dual stage catalytic converter for converting sulfur dioxide into sulfur trioxide, an improved system for reducing the temperature of the gas flowing into an inlet of the second stage of the catalytic converter from the first stage, comprising:
  a. a water nozzle coupled to the inlet of the second stage of the catalytic converter;
  b. a water control valve coupling an inlet of the water nozzle to a source of water, the water control valve having a control input;
  c. a controller having an output coupled to the input of the control valve;
  d. a temperature sensor coupled to the inlet of the second stage of the catalytic converter and having an output coupled to an input of the controller; and
  e. the controller comparing the temperature sensed at the inlet of the second stage of the catalytic converter by the temperature sensor to a desired temperature and opening and closing the water control valve based on the comparison to cause water to be selectively injected into the gas stream of the gas flowing from the first stage of the catalytic converter into the second stage of the catalytic converter to maintain the temperature of the gas entering the second stage of the catalytic converter at the desired temperature.

14. In a sulfur trioxide flue gas conditioning system that has a sulfur furnace for generating sulfur dioxide by combusting sulfur therein, a catalytic converter coupled to the sulfur furnace, a sulfur dioxide gas stream containing the sulfur dioxide generated by the sulfur furnace flowing from the sulfur furnace into the catalytic converter which converts the sulfur dioxide gas stream into sulfur trioxide, an improved method for reducing the temperature of the sulfur dioxide gas stream, comprising the steps of:
  a. sensing the temperature of the sulfur dioxide gas stream at the inlet of the catalytic converter;
  b. determining the amount of water to inject into the sulfur dioxide gas stream to bring the temperature of the sulfur dioxide gas stream at the inlet of the catalytic converter to the desired setpoint temperature;
  c. determining the rate at which to inject the determined amount of water into the sulfur dioxide gas stream to bring the temperature of the sulfur dioxide gas stream at the inlet of the catalytic converter to the desired setpoint temperature; and
  d. injecting the determined amount of water into the sulfur dioxide gas stream at the determined rate at which to inject the determined amount of water into the sulfur dioxide gas stream upstream of the catalytic converter if necessary to bring the temperature of the sulfur dioxide gas stream at the inlet of the catalytic converter to a desired setpoint.

15. In a sulfur trioxide flue gas conditioning system that has a sulfur furnace for generating sulfur dioxide by combusting sulfur therein, wherein the flue gas conditioning system includes a blower for blowing process air into the sulfur furnace, a catalytic converter coupled to the sulfur furnace, a sulfur dioxide gas stream containing the sulfur dioxide generated by the sulfur furnace flowing from the sulfur furnace into the catalytic converter which converts the sulfur dioxide gas stream into sulfur trioxide, an improved method for reducing the temperature of the sulfur dioxide gas stream, comprising the steps of:

a. sensing the temperature of the sulfur dioxide gas stream at the inlet of the catalytic converter;

b. injecting water into the sulfur dioxide gas stream upstream of the catalytic converter if necessary to bring the temperature of the sulfur dioxide gas stream at the inlet of the catalytic converter to a desired setpoint;

c. determining the amount of steam produced by the evaporation of the water injected into the sulfur dioxide gas stream; and d. varying the output of the blower accordingly to maintain the volume of gas entering the catalytic converter relatively constant.

16. In a sulfur trioxide flue gas conditioning system that has a sulfur furnace for generating sulfur dioxide by combusting sulfur therein, a catalytic converter coupled to the sulfur furnace, a sulfur dioxide gas stream containing the sulfur dioxide generated by the sulfur furnace flowing from the sulfur furnace into the catalytic converter which converts the sulfur dioxide gas stream into sulfur trioxide, an improved method for reducing the temperature of the sulfur dioxide gas stream, comprising the steps of:

a. sensing the temperature of the sulfur dioxide gas stream at the inlet of the catalytic converter;

b. determining the concentration of sulfur dioxide in the sulfur dioxide gas stream;

c. determining the proper amount of water to inject into the sulfur dioxide gas stream based upon the determined concentration of sulfur dioxide in the sulfur dioxide gas stream; and d. injecting the determined proper amount of water into the sulfur dioxide gas stream upstream of the catalytic converter if necessary to bring the temperature of the sulfur dioxide gas stream at the inlet of the catalytic converter to a desired setpoint.

17. The method of claim 16 wherein the flue gas conditioning system includes a blower coupled to an inlet of the sulfur furnace for supplying process air thereto, and the step of determining the concentration of sulfur dioxide in the sulfur dioxide gas stream comprises determining the volume of process air flowing from the blower into the sulfur furnace, the temperature of the process a flowing from the blower to the sulfur furnace, and the temperature of the sulfur dioxide gas stream and determining the concentration of sulfur dioxide in the sulfur dioxide gas stream therefrom.

18. In a sulfur trioxide flue gas conditioning system that has a sulfur furnace for generating sulfur dioxide by combusting sulfur therein, a catalytic converter coupled to the sulfur furnace, wherein the sulfur furnace is connected to the catalytic converter by a pipe, a sulfur dioxide gas stream containing the sulfur dioxide generated by the sulfur furnace flowing from the sulfur furnace into the catalytic converter which converts the sulfur dioxide gas stream into sulfur trioxide, an improved method for reducing the temperature of the sulfur dioxide gas stream, comprising the steps of:

a. sensing the temperature of the sulfur dioxide gas stream at the inlet of the catalytic converter; and b. injecting water into the sulfur dioxide gas stream upstream of the catalytic converter, wherein water is injected through a plurality of water nozzles which are mounted to the pipe in spaced relation to each other and sequentially opening and closing water flow out of the nozzles based on the temperature at the outlet of the catalytic converter, if necessary to bring the temperature of the sulfur dioxide gas stream at the inlet of the catalytic converter to a desired setpoint.

19. The method of claim 18 wherein the catalytic converter comprises a dual stage catalytic converter, and further including the steps of sensing the temperature at the inlet of the second stage of the catalytic converter, comparing the sensed temperature to the desired setpoint and injecting water into the gas stream to maintain the gas at the desired setpoint.

20. The method of claim 18 wherein the plurality of nozzles comprises three nozzles, a first one of the nozzles located generally at the outlet of the sulfur furnace, a second one of the nozzles located generally midway between the sulfur furnace and the catalytic converter, and a third one of the nozzles located generally at the inlet to the catalytic converter, each nozzle coupled to a source of water through respective pneumatic water control valves, the step of sequentially opening and closing the water flow our of the nozzles comprising sequentially opening and closing the pneumatic water control valves.

21. The method of claim 18 wherein the catalytic converter comprises a two-stage catalytic converter having an outlet of its first stage coupled to an inlet of its second stage, and further including the step of reducing the temperature of the gas flowing from the first stage of the catalytic converter to the second stage of the catalytic converter by injecting water into the gas stream as it flows from the first stage of the catalytic converter to the second stage of the catalytic converter.

22. The method of claim 21 wherein the step of injecting water into the gas stream as it flows between the first stage of the catalytic converter to the second stage of the catalytic converter comprises the catalytic converter having coupling means coupling its first stage to its second stage, a water nozzle coupled to the coupling means and to a source of water through pneumatic water control valves and opening and closing the pneumatic water control valves to cause water flow from the nozzle into the coupling means to vary the temperature of the gas stream entering the second stage of the catalytic converter to maintain the temperature at a desired setpoint.

* * * * *